United States Patent
Lee et al.

(10) Patent No.: US 9,661,555 B2
(45) Date of Patent: *May 23, 2017

(54) METHOD AND APPARATUS FOR TRANSMITTING MANAGEMENT INFORMATION FRAME IN WIRELESS LOCAL AREA NETWORK SYSTEM

(71) Applicant: LG ELECTRONICS INC., Seoul (KR)

(72) Inventors: Dae Won Lee, Anyang-si (KR); Yong Ho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/842,657

(22) Filed: Sep. 1, 2015

(65) Prior Publication Data

US 2015/0373625 A1 Dec. 24, 2015

Related U.S. Application Data

(63) Continuation of application No. 13/978,847, filed as application No. PCT/KR2011/009175 on Nov. 29, 2011, now Pat. No. 9,137,738.

(Continued)

(51) Int. Cl.
*H04W 4/00* (2009.01)
*H04W 48/08* (2009.01)
(Continued)

(52) U.S. Cl.
CPC .......... *H04W 48/08* (2013.01); *H04B 7/0452* (2013.01); *H04W 48/12* (2013.01);
(Continued)

(58) Field of Classification Search
CPC ..... H04W 48/12; H04W 84/12; H04W 48/16; H04W 88/08; H04W 76/02; H04W 48/18
(Continued)

(56) References Cited

U.S. PATENT DOCUMENTS

9,137,738 B2 * 9/2015 Lee ................. H04W 48/12
2006/0114928 A1 6/2006 Utsunomiya et al.
(Continued)

FOREIGN PATENT DOCUMENTS

CN 101449521 A 6/2009
CN 101449617 A 6/2009
(Continued)

OTHER PUBLICATIONS

D. Lee, "BSS Load Balancing for MU-MIMO," IEEE 802.11-10/1278r0, Nov. 9, 2010, 14 pages.
(Continued)

*Primary Examiner* — Chi H Pham
*Assistant Examiner* — Alexander O Boakye
(74) *Attorney, Agent, or Firm* — Birch, Stewart, Kolasch & Birch, LLP

(57) ABSTRACT

A method for reporting load information in a wireless local area network system, and a device therefore are discussed. The method according to one embodiment includes transmitting basic service set (BSS) load information, the BSS load information including a multi user (MU) multiple input multiple output (MIMO) capable station count field, a first utilization field and a second utilization field. In addition, the MU-MIMO capable station count field indicates a total number of stations with MU reception capability currently associated with a BSS managed by the AP. Additionally, the first utilization field includes information about an interval during which a 40 MHz channel width is busy. Lastly, the (Continued)

second utilization field include information about an interval during which a 80 MHz channel width is busy.

6 Claims, 17 Drawing Sheets

Related U.S. Application Data

(60) Provisional application No. 61/431,388, filed on Jan. 10, 2011.

(51) Int. Cl.
*H04W 48/12* (2009.01)
*H04B 7/0452* (2017.01)
*H04W 72/04* (2009.01)
*H04W 84/12* (2009.01)
*H04W 48/20* (2009.01)

(52) U.S. Cl.
CPC .......... *H04W 48/20* (2013.01); *H04W 72/042* (2013.01); *H04W 84/12* (2013.01)

(58) Field of Classification Search
USPC ....... 370/252, 230, 448, 278, 315, 431, 463, 370/471, 474, 476, 465, 338; 455/266, 455/412.1
See application file for complete search history.

(56) References Cited

U.S. PATENT DOCUMENTS

| | | |
|---|---|---|
| 2007/0014267 A1 | 1/2007 | Lam et al. |
| 2007/0293218 A1 | 12/2007 | Meylan et al. |
| 2008/0102852 A1 | 5/2008 | Du et al. |
| 2009/0300763 A1 | 12/2009 | Harvey et al. |
| 2010/0177657 A1 | 7/2010 | Kim et al. |
| 2011/0255401 A1 | 10/2011 | Seok |
| 2011/0305139 A1 | 12/2011 | Kwak et al. |

FOREIGN PATENT DOCUMENTS

| | | |
|---|---|---|
| JP | 2012-529217 A | 11/2012 |
| KR | 10-2010-0072687 A | 7/2010 |
| KR | 10-2010-0084139 A | 7/2010 |
| WO | WO 2005/109761 A1 | 11/2005 |
| WO | WO 2006/031834 A2 | 3/2006 |
| WO | WO 2008/052066 A2 | 5/2008 |
| WO | WO 2010/074471 A2 | 7/2010 |
| WO | WO 2010/140742 A1 | 12/2010 |

OTHER PUBLICATIONS

D. Lee, "Comment Resolution for VHT BSS Load Element," IEEE P802.11, Wireless LANs, IEEE 802.11-11/0303r0, Mar. 21, 2011, 7 pages.

Lee et al., "Performance of an efficient Method for Association Admission Control in Public Wireless LAN Systems," 2004 IEEE 60th Vehicular Technology Conference, Sep. 26, 2004, pp. 5049-5053.

* cited by examiner

| Element ID (11) | Length (5) | Station Count | Channel Utilization | Available Admission Capacity |
|---|---|---|---|---| octets ← 1 → ← 1 → ← 2 → ← 2 → ← 2 →

| Element ID | Length | Channel Correlation Threshold | Number of Correlated STAs | Number of Uncorrelated STAs | Channel Utilization of Correlated STA | Channel Utilization of Uncorrelated STA |
|---|---|---|---|---|---|---|
| 1 | 1 | 1 | 1 | 1 | 1 | 1 |

Octets

Figure 3

| Element ID | Length | Number of VHT STAs | Number of Non-VHT STAs | Channel Utilization of VHT STA | Channel Utilization of non-VHT STA | Antenna Utilization of VHT STA | Bandwidth Utilization VHT STA |
|---|---|---|---|---|---|---|---|
| 1 | 1 | 1 | 1 | 1 | 1 | 1 | 1 |

Octets

Figure 5

MU-MIMO utilization calculated by a function of (e.g. average) of utilization across busy time Legacy utilization calculated by a function of busy time

Figure 18

| Element ID | Length | MU-MIMO capable STA Count | Spatial Stream Utility | BW Utility 40MHz | BW Utility 80MHz | BW Utility 160MHz |
|---|---|---|---|---|---|---|
| 1 | 1 | 2 | 1 | 1 | 1 | 1 | octets

Figure 19

| Element ID | Length | MU-MIMO capable STA Count | Spatial Stream Utility | BW Idle Utility 40MHz | BW Idle Utility 80MHz | BW Idle Utility 160MHz | BW busy Utility 40MHz | BW busy Utility 80MHz | BW busy Utility 160MHz |
|---|---|---|---|---|---|---|---|---|---|
| 1 | 1 | 2 | 1 | 1 | 1 | 1 | 1 | 1 | 1 | octets

METHOD AND APPARATUS FOR TRANSMITTING MANAGEMENT INFORMATION FRAME IN WIRELESS LOCAL AREA NETWORK SYSTEM

CROSS REFERENCE TO RELATED APPLICATIONS

This application is a Continuation of co-pending U.S. patent application Ser. No. 13/978,847 filed on Jul. 9, 2013, which is the National Phase of PCT international Application No. PCT/KR2011/009175 filed on Nov. 29, 2011, and which claims priority to U.S. Provisional Application No. 61/431,388 filed on Jan. 10, 2011. The entire content of all of the above applications are hereby incorporated by reference.

BACKGROUND OF THE INVENTION

Field of the Invention

The present invention relates to wireless communications, and more particularly, to a method for transmitting management information in a wireless local area network (WLAN) system and an apparatus for supporting the method.

Discussion of the Related Art

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

Ever since the institute of electrical and electronics engineers (IEEE) 802, i.e., a standardization organization for WLAN technologies, was established in February 1980, many standardization works have been conducted. In the initial WLAN technology, a frequency of 2.4 GHz was used according to the IEEE 802.11 to support a data rate of 1 to 2 Mbps by using frequency hopping, spread spectrum, infrared communication, etc. Recently, the WLAN technology can support a data rate of up to 54 Mbps by using orthogonal frequency division multiplex (OFDM). In addition, the IEEE 802.11 is developing or commercializing standards of various technologies such as quality of service (QoS) improvement, access point protocol compatibility, security enhancement, radio resource measurement, wireless access in vehicular environments, fast roaming, mesh networks, inter-working with external networks, wireless network management, etc. The IEEE 802.11n is a technical standard relatively recently introduced to overcome a limited data rate which has been considered as a drawback in the WLAN. The IEEE 802.11n is devised to increase network speed and reliability and to extend an operational distance of a wireless network.

The IEEE 802.11n supports a high throughput (HT), i.e., a data processing rate of up to 540 Mbps or higher, and is based on a multiple input and multiple output (MIMO) technique which uses multiple antennas in both a transmitter and a receiver to minimize a transmission error and to optimize a data rate. In addition, this standard may use a coding scheme which transmits several duplicate copies to increase data reliability and also may use the OFDM to support a higher data rate.

With the widespread use of the WLAN and the diversification of applications using the WLAN, there is a recent demand for a new WLAN system to support a higher throughput than a data processing rate supported by the IEEE 802.11n. However, an IEEE 802.11n medium access control (MAC)/physical layer (PHY) protocol is not effective to provide a throughput of 1 Gbps or higher. This is because the IEEE 802.11n MAC/PHY protocol is designed for an operation of a single station (STA), that is, an STA having one network interface card (NIC), and thus when a frame throughput is increased while conforming to the conventional IEEE 802.11n MAC/PHY protocol, a resultant additional overhead is also increased. Consequently, there is a limitation in increasing a throughput of a wireless communication network while conforming to the conventional IEEE 802.11n MAC/PHY protocol, that is, a single STA architecture.

Therefore, to achieve a data processing rate of 1 Gbps or higher in the wireless communication system, a new system different from the conventional IEEE 802.11n MAC/PHY protocol (i.e., the single STA architecture) is required. A very high throughput (VHT) WLAN system is a next version of the IEEE 802.11n WLAN system, and is one of IEEE 802.11 WLAN systems which have recently been proposed to support a data processing rate of 1 Gbps or higher in a MAC service access point (SAP).

The VHT WLAN system allows simultaneous channel access of a plurality of VHT non-AP STAs for the effective use of a radio channel. For this, a multi-user multiple input multiple output (MU-MIMO)-based transmission using multiple antennas is supported. A VHT access point (AP) can concurrently transmit spatial-multiplexed data to a plurality of VHT non-AP STAs. When data is concurrently transmitted by distributing a plurality of spatial streams to the plurality of non-AP STA through a plurality of antennas, an overall throughput of the WLAN system can be increased.

In the WLAN system, the non-AP STA performs scanning, authentication, and association procedures on an AP that provides a service. If a plurality of APs are found as a result of AP scanning performed by the non-AP STA, the non-AP STA can select an AP to be associated. In this case, load balancing of an overall network is preferably taken into account when the non-AP STA selects the AP.

A plurality of APs are installed as WLAN terminals are widespread and its utilization is increased. Accordingly, an overlapping basic service set (OBSS) environment increases in which a basic service area (BSA) of a basic service set (BSS) using the same channel overlaps either partly or wholly. In addition, in case of a WLAN supporting MU-MIMO, there may be more considerations when selecting an AP to be associated with a non-AP STA. Therefore, it may be very important to provide the non-AP STA with information that can be used in a process of selecting the AP to be associated with the non-AP STA in terms of managing overall efficiency of the WLAN.

In order to increase the overall efficiency of the WLAN, there is a need for a method for generating control information that can be used by a non-AP STA when selecting an AP to be associated with the non-AP STA and for transmitting the control information to the non-AP STA and also a method for selecting the AP by the non-AP STA on the basis of the control information.

SUMMARY OF THE INVENTION

The present invention provides a method for transmitting load information an access point (AP) in a wireless local area network (WLAN) system.

The present invention also provides a method for determining an AP to be associated with a non-AP station (STA) and an apparatus for performing the method.

In an aspect of the present invention, a method of transmitting management information, performed by an access point (AP), in a wireless local area network system includes transmitting, to a station, a frame including a BSS load information element, the BSS load element including a multi user (MU) multiple input multiple output (MIMO) capable STA count field and a plurality of bandwidth utilization fields, wherein the MU-MIMO capable STA count field indicates a total number of STAs with MU reception capability currently associated with a candidate BSS managed by the AP and the plurality of bandwidth utilization fields indicate whether a plurality of operating channel width are busy.

Each utilization field may indicate whether each of operating channel width is busy.

The plurality of bandwidth utilization fields may include a first utilization field corresponding to 40 MHz operating channel width of the AP, a second utilization field corresponding to 80 MHz operating channel width of the AP and a third utilization field corresponding to 160 MHz operating channel width of the AP.

The method may further include receiving, from the station, a probe request frame for scanning the candidate BSS with which the station associate and wherein the frame is a probe response frame transmitted in response to the probe request frame.

Each of the plurality of bandwidth utilization fields may be defined as a percentage of time that each of operating channel width is busy.

The percentage of time may be linearly scaled with 255.

The method may further include performing carrier sense mechanism for determining state of each of operating channel width used to configure each of the plurality of bandwidth utilization fields.

The station determines a target BSS with which the station associates, based on the information indicated by the BSS load information element.

The frame may be a beacon frame broadcasted periodically.

In another aspect of the present invention, an access point (AP) in a wireless local area network system includes a processor configured to transmit, to a station, a frame including a BSS load information element, the BSS load element including a multi user (MU) multiple input multiple output (MIMO) capable STA count field and a plurality of bandwidth utilization fields, wherein the MU-MIMO capable STA count field indicates a total number of STAs with MU reception capability currently associated with a candidate BSS managed by the AP and the plurality of bandwidth utilization fields indicate whether a plurality of operating channel width are busy.

According to the present invention, available resource information of an access point (AP) can be reported to a non-AP station (STA), and the non-AT STA can use the available resource information of the AP when selecting the AP to be associated with the non-AP STA, thereby being able to increase efficiency of a wireless local area network (WLAN).

BRIEF DESCRIPTION OF THE DRAWINGS

FIG. 3 shows an example of a BSS load IE including channel correlation information according to an embodiment of the present invention.

FIG. 5 is an example of a BSS load IE format according to another embodiment of the present invention.

FIG. 18 shows an example of a BSS load IE according to an embodiment of the present invention when channel utility information is reported for each bandwidth.

FIG. 19 shows an example of a BSS load IE format when reporting both a BW idle metric and a BW busy metric.

DETAILED DESCRIPTION OF THE INVENTION

Hereinafter, exemplary embodiments of the present invention will be described with reference to the accompanying drawings.

A wireless local area network (WLAN) system according to an embodiment of the present invention includes at least one basic service set (BSS). The BSS is a set of stations (STAs) successfully synchronized to communicate with one another. The STA is any functional medium including a medium access control (MAC) and wireless-medium physical layer (PHY) interface satisfying the institute of electrical and electronics engineers (IEEE) 802.11 standard. The STA may be an AP or a non-AP STA.

An AP is any entity that has STA functionality and provides access to a distribution services (DS) via a wireless medium (WM) for associated STAs. The AP can also be referred to as other terms, such as a centralized controller, a base station (BS), a scheduler, etc.

The non-AP STA is an STA other than an AP, and can be referred to as other terms, such as a user equipment (UE), a mobile station (MS), a mobile terminal (MT), a portable terminal, an interface card, etc.

The BSS can be classified into an independent BSS (IBSS) and an infrastructure BSS. The infrastructure BSS includes at least one non-AP STA and AP.

Figures 1, 2:
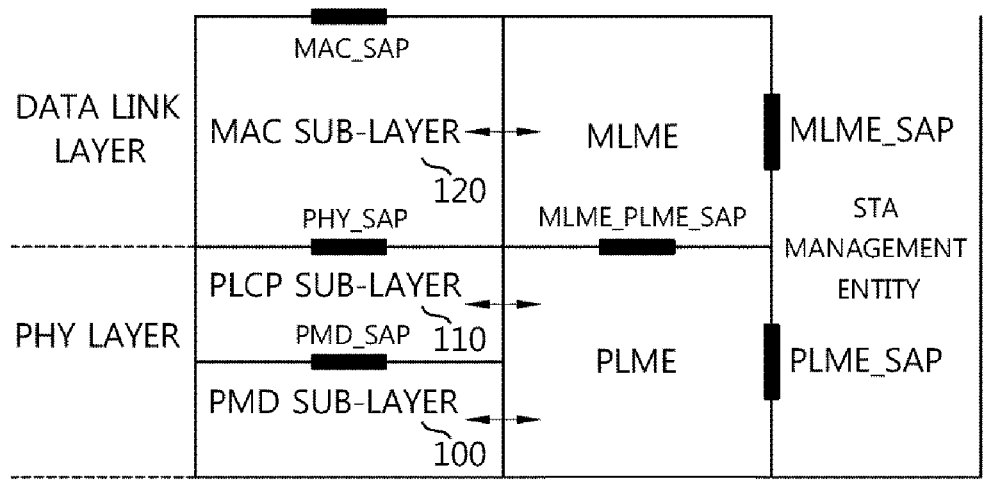
FIG. 1 shows an IEEE 802.11 physical layer architecture.
FIG. 2 shows an example of a BSS load information element format transmitted by being included in a management frame.

FIG. 1 shows an IEEE 802.11 physical layer architecture.

The IEEE 802.11 physical (PHY) layer architecture includes a PHY layer management entity (PLME), a physical layer convergence procedure (PLCP) sub-layer 110, and a physical medium dependent (PMD) sub-layer 100. The PLME provides a PHY layer management function in cooperation with a MAC layer management entity (MLME). The PLCP sub-layer 110 located between a MAC sub-layer 120 and the PMD sub-layer 100 delivers to the PMD sub-layer 100 a MAC protocol data unit (MPDU) received from the MAC sub-layer 120 under the instruction of the MAC layer 120, or delivers to the MAC sub-layer 120 a frame received from the PMD sub-layer 100. The PMD sub-layer 100 is a lower layer of the PLCP sub-layer and serves to enable transmission and reception of a PHY layer entity between two STAs through a radio medium.

The PLCP sub-layer 110 attaches an additional field including information required by a PHY transceiver to the MPDU in a process of receiving the MPDU from the MAC sub-layer 120 and delivering the MPDU to the PMD sub-layer 100. The additional field attached in this case may be a PLCP preamble, a PLCP header, tail bits required on a data field, etc. The PLCP preamble serves to allow a receiver to prepare a synchronization function and antenna diversity before a PLCP service data unit (PSDU=MPDU) is transmitted. The PLCP header includes a field that contains essential information for receiving and restoring a frame by a reception STA.

The PLCP sub-layer 110 generates a PLCP protocol data unit (PPDU) by attaching the aforementioned field to the MPDU and transmits the generated PPDU to the reception STA via the PMD sub-layer. The reception STA receives the PPDU, acquires information required for data recovery from the PLCP preamble and the PLCP header, and recovers the data.

In order for the non-AP STA to participate in the WLAN, compatible networks have to be identified. A scanning procedure is defined as a process in which the non-AP STA identifies a network that exists in a specific region. In other words, the scanning procedure is a process of finding a candidate AP to be associated with the non-AP STA in an association or re-association procedure.

The scanning procedure has two types, i.e., passive scanning and active scanning. The passive scanning is a method of using a beacon frame periodically transmitted by the AP. The non-AP STA may receive the beacon frame, which is periodically transmitted by the AP that manages a BSS, to find an accessible BSS.

The active scanning is a method of finding an accessible BSS by transmitting a probe request frame by the non-AP STA. In case of using the active scanning, when the non-AP STA transmits the probe request frame, an AP that receives the probe request frame transmits to the non-AP STA a probe response frame including information such as a service set ID of the BSS managed by the AP, capability supported by the AP, etc. By the use of the received probe response frame, the non-AP STA can know a variety of information regarding the candidate AP together with the existence of the candidate AP.

The non-AP STA can know whether a joinable BSS exists by using the received beacon frame or the probe response frame in the scanning procedure.

The scanning procedure is followed by an authentication procedure for negotiating an authentication scheme and an encryption scheme between entities participating in wireless communication. For example, the non-AP STA can perform the authentication procedure with an AP to be associated among one or more APs found in the scanning procedure. The authentication procedure can use various schemes such as open-system authentication, shared-key authentication, pre-authentication, proprietary public-key authentication based on an algorithm developed by a vendor, etc. Examples of a further reinforced authentication scheme include IEEE 802.1x-based Extensible Authentication Protocol-Transport Layer Security (EAP-TLS), Extensible Authentication Protocol-Tunneled Transport Layer Security (EAP-TTLS), Extensible Authentication Protocol-Flexible Authentication via Secure Tunneling (EAP-FAST), and Protected Extensible Authentication Protocol (PEAP).

After authentication is successfully complete in the authentication procedure, the non-AP STA can perform an association procedure with the AP. The association procedure implies establishing of an identifiable connection (i.e., radio link) between the non-AP STA and the AP.

In the association procedure, the non-AP STA transmits an association request frame to the AP which successfully completes the authentication procedure, and in response thereto, the AP transmits an association response frame having a status code of 'successful' to the non-AP STA. The association response frame includes an identifier (e.g., an association ID (AID)) capable of identifying an association with a specific non-AP STA.

In a case where a connection status between the non-AP STA and the AP deteriorates due to a variable channel state even after the association procedure is successfully complete, the non-AP STA can perform again the association procedure with another AP having a good channel state, which is referred to as a re-association procedure. The re-association procedure is very similar to the aforementioned association procedure. More specifically, in the re-association procedure, the non-AP STA transmits a re-association request frame to a different AP (e.g., an AP which successfully completes the authentication procedure among candidate APs found in the aforementioned scanning procedure) other than an AP currently associated with the non-AP STA, and the different AP transmits a re-association response frame to the non-AP STA. However, the re-association request frame includes information on a previously associated AP. By using this information, the re-associated AP can deliver data buffered in the previous AP to the non-AP STA.

Hereinafter, a method of determining a specific BSS to be joined will be described in greater detail when a non-AP STA finds a plurality of joinable BSSs as a result of the aforementioned scanning procedure. The determining of the specific BSS to which the non-AP STA will join can also be expressed as determining of a specific AP on which authentication and association procedures will be performed.

When the non-AP STA selects one of a plurality of candidate BSSs to which the non-AP STA can join and thus determines a BSS to be joined, it may be preferable to determine the BSS by considering a load of each candidate BSS. Non-AP STA population and traffic levels of each candidate BSS can be used to determine the BSS to be joined so as to prevent a load to be concentrated in a specific BSS, thereby being able to increase overall efficiency of a WLAN system. For this, each candidate BSS's load information that can be used by the non-AP STA needs to be reported to the non-AP STA.

The AP can transmit a management frame including a load information element of the BSS in order to report state information of the AP to an STA. The management frame including the load information element may be unicast to a non-AP STA performing scanning in the scanning procedure or may be broadcast to all STAs within a basic service area (BSA) of the BSS. Alternatively, the management frame including the BSS load IE may be broadcast periodically to a non-AP STA within the BSA.

FIG. 2 shows an example of a BSS load information element format transmitted by being included in a management frame.

The BSS load information element contains information on the current STA population and traffic levels in the BSS. This information element may be used by the non-AP STA for AP selection algorithm when roaming.

The BSS load information element of FIG. 2 includes an Element ID field including identification information of an information element (IE), a Length field including length information of the IE, an STA Count field, a Channel Utilization field, and an Available Admission Capacity field.

The STA Count field is interpreted as an unsigned integer that indicates the total number of STAs currently associated with this BSS.

The Channel Utilization field is defined as the percentage of time, linearly scaled with 255 representing 100%, that the AP sensed the medium was busy, as indicated by either the physical or virtual carrier sense (CS) mechanism. When more than one channel is in use for the BSS, the Channel Utilization field value is calculated only for the primary channel. This percentage is computed using the equation 1.

$$\text{Channel Utilization=Integer}((\text{channel\_busy\_time}/(\text{dot11ChannelUtilizationBeaconIntervals} \times \text{dot11BeaconPeriod} \times 1024)) \times 255), \quad [\text{Equation 1}]$$

where channel_busy_time is defined to be the number of microseconds during which the CS mechanism has indicated a channel busy indication, dot11ChannelUtilizationBeaconIntervals represents the number of consecutive beacon intervals during which the channel busy time is measured.

The Available Admission Capacity field may be 2 octets long and contains an unsigned integer that specifies the remaining amount of medium time available via explicit admission control, in units of 32 μs/s. The field is helpful for roaming non-AP STAs to select an AP that is likely to accept future admission control requests, but it does not represent a guarantee that the HC will admit these requests.

In the BSS load information element format of FIG. 2, AP's load information (e.g., a spatial re-use factor of STAs, a channel correlation among the STAs, etc.) related to MIMO transmission is not included in a WLAN system supporting MIMO transmission. A non-AP STA which intends to select an AP in the WLAN system supporting MIMO transmission is preferably capable of selecting the AP by also considering information of a spatial re-use factor of candidate APs, a channel correlation among non-AP STAs, etc. Hereinafter, transmission information and a method of transmitting a variety of BSS load information that can be transmitted by an AP to a non-AP STA in a WLAN system supporting MU-MIMO will be described in detail by taking a detailed example.

In the following description of the present invention, the BSS load IE is an IE including control information transmitted by an AP to a non-AP STA in a BSA, and its name is for exemplary purposes only. Hereinafter, information transmitted by being included in the BSS load IE may be transmitted by being included in one IE or may be transmitted as a separate IE.

The AP may transmit the BSS load IE by using a control frame and/or a management frame. The control frame and/or the management frame may be unicast to the non-AP STA or may be broadcast to all non-AP STAs within a BSA. The AP may transmit the BSS load IE at the request of information provision, or may transmit an unsolicited BSS load IE irrespective of the request of information provision. The management frame may be the beacon frame or the probe response frame. The non-AP STA may select an optimal AP on the basis of information obtained by using the BSS load IE.

FIG. 3 shows an example of a BSS load IE including channel correlation information according to an embodiment of the present invention.

An AP transmits the BSS load IE to a non-AP STA. Herein, the BSS load IE includes information such as Channel Correlation Threshold, Number of Correlated STAs, Number of Uncorrelated STAs, Channel Utilization of Correlated STA, and Channel Utilization of Uncorrelated STA.

Figure 4:
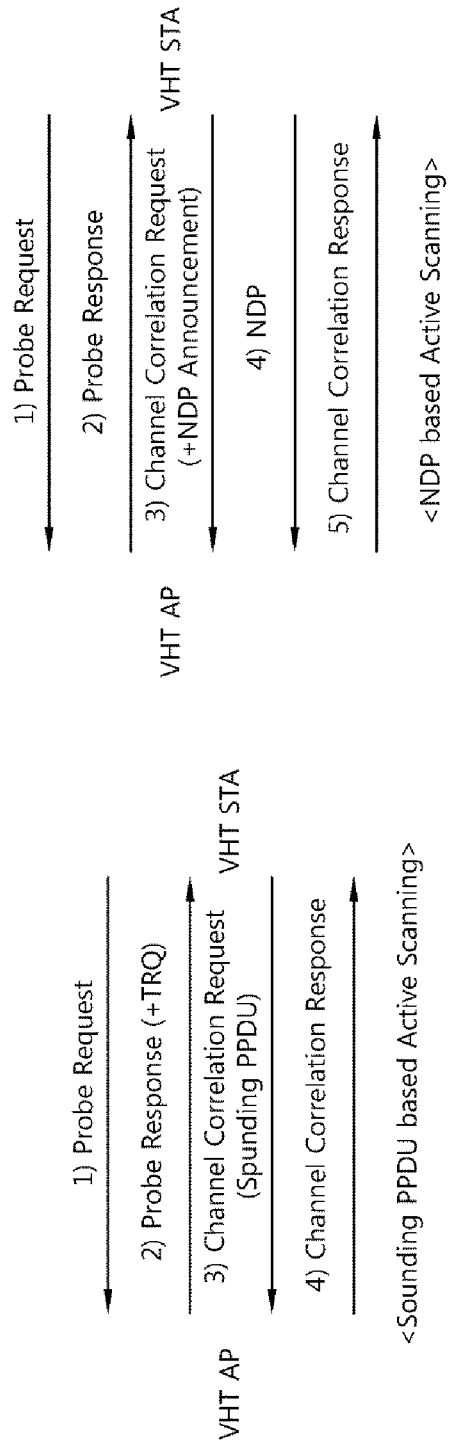
FIG. 4 shows an example of procedure for providing the BSS load IE of FIG. 3 by an AP to a non-AP STA.

FIG. 4 shows an example of procedure for providing the BSS load IE of FIG. 3 by an AP to a non-AP STA.

In the example of FIG. 4, the non-AP STA transmits to an AP a request frame for requesting channel correlation related information of FIG. 3 to request a channel correlation IE in an active scanning procedure. Thereafter, in response to the request frame, the channel correlation related information is obtained by receiving a response frame including the BSS load IE (of the FIG. 3) containing the channel correlation related information. The non-AP STA can utilize the obtained information in AP selection. As described above, the response frame may be transmitted without the request frame.

Hereinafter, the active scanning procedure will be described for two cases, i.e., a sounding PPDU based active scanning procedure and a null data packet (NDP) based active scanning procedure. The sounding PPDU based active scanning procedure will be first described. When a non-AP STA transmits a probe request frame, an AP receiving the probe request frame transmits a probe response frame in response to the probe request frame. In this case, the probe response frame may include a training request (TRQ) message for requesting the non-AP STA to transmit the sounding PPDU. Upon confirming the TRQ message included in the probe response frame, the non-AP STA transmits to the AP a request frame for requesting channel correlation related information. In this case, the request frame may act as the sounding PPDU. That is, the AP can perform channel estimation by using the request frame. The AP transmits to the non-AP STA a response frame including a BSS load IE in response to the request frame for requesting the channel correlation related information. The non-AP STA receives the response frame and can use information obtained by using the BSS load TE to determine an AP to be authenticated and associated with the non-AP STA.

In the NDP based active scanning procedure, the BSS load IE can be provided as follows. The non-AP STA and the AP exchange the probe request flame and the probe response frame. The non-AP STA transmits to the AP a request frame for requesting the channel correlation related information. The request frame includes an NDP announcement message for reporting that the NDP will be transmitted subsequently. The non-AP STA transmits the NDP to the AP subsequently to the request frame. The AP performs channel estimation by using the NDP, and transmits to the non-AP STA the response frame including the BSS load IE containing the channel correlation related information. A channel estimation result may be considered in information transmitted by being included in the BSS load IE.

For another example, the AP can broadcast the BSS load IE irrespective of the request of the non-AP STA. The non-AP STA can select the AP by considering the broadcast BSS load IE. The BSS load IE which is broadcast by the AP may include information of antenna utilization and bandwidth utilization together with channel utilization.

The antenna utilization may be a value indicating a utilization of a usage amount of a MU-MIMO spatial stream. The bandwidth utilization may be a value indicating a utilization of a channel bandwidth in use.

FIG. 5 is an example of a BSS load IE format according to another embodiment of the present invention. The BSS load IE of FIG. 5 allows a non-AP STA for receiving the BSS load IE to be able to use a channel correlation between non-AP STAs supporting MU-MIMO and performance for a case where the non-AP STAs supporting MU-MIMO are co-scheduled.

The AP transmits the BSS load IE including a STA Count field, a Channel Utilization field, and an Available Admission Capacity field. The non-AP STA may consider the BSS load IE in AP selection to achieve overall network's load balancing.

In one embodiment, the AP may transmit a beacon frame by including the BSS load IE. In this case, the BSS load IE may include the STA Count field, the Channel Utilization field, and the Available Admission Capacity field.

A non-AP STA supporting only SU-MIMO and a non-AP STA supporting MU-MIMO may coexist within a BSS. From the perspective of the AP, a case of transmitting and receiving data by utilizing a channel by the non-AP STAs supporting only SU-MIMO and a case of transmitting and receiving data by utilizing a channel by the STAs supporting MU-MIMO have to be both supported.

Figure 6:
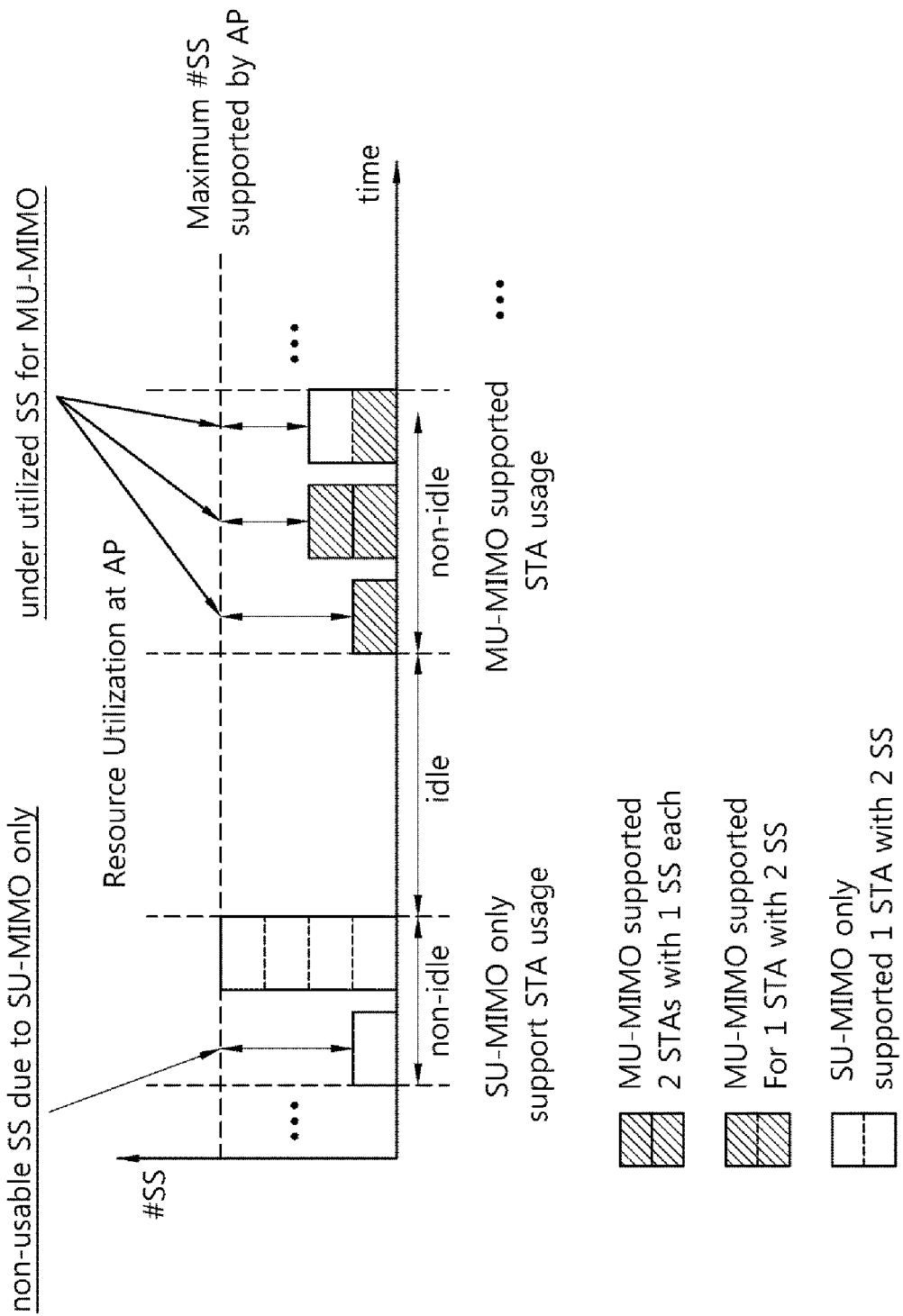
FIG. 6 shows a utilization of a channel used from the perspective of an AP.

FIG. 6 shows a utilization of a channel used from the perspective of an AP.

A time window in which the AP measures a load status may include a legacy or SU-MIMO format channel busy period and idle period measured in a PHY layer, and may include a time duration in which an AP supporting MU-MIMO is serving data by using MU-MIMO.

In the time duration in which the AP transmits data by using MU-MIMO, the number of spatial streams (SSs) transmitted by the AP may not be the maximum transmissible number according to a situation. For example, it is assumed that there is only one STA supporting MU-MIMO, and the STA supports only one SS. In this case, the AP cannot use more than one SS in the time duration of MU-MIMO transmission, and thus a system operates with a system capacity lower than that can be serviced by the AP in practice. As a result, usage efficiency of radio resources decreases. There is a need for a method for effectively using MU-MIMO by allowing the AP supporting MU-MIMO to be able to fully utilize available capacity.

According to an embodiment of the present invention, the usage efficiency of radio resources can be increased by reporting a MU-MIMO utilization or a MU-MIMO under utilization to the non-AP STA. In the MU-MIMO (under) utilization according to the embodiment of the present invention, similar to the BSS load IE, a (under) utilization metric which considers a load in the reporting is calculated by utilizing spatial stream count information which is used (or not used) by the AP. That is, when calculating the MU-MIMO (under) utilization, reporting can be performed by utilizing spatial stream information for MU-MIMO, a carrier sense (SS) busy time, time duration information for calculating reporting, etc.

Hereinafter, calculation of the MU-MIMO (under) utilization will be described in greater detail by taking an example.

Figure 7:
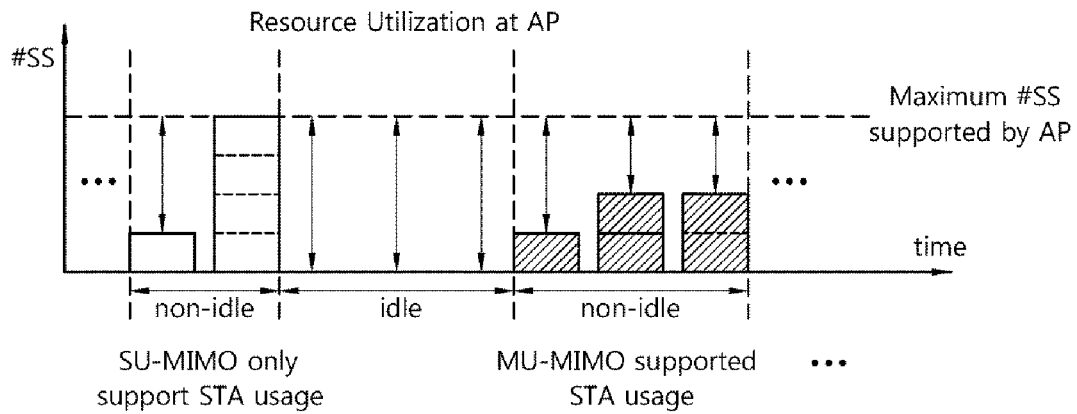
FIG. 7 shows a method of expressing a MU-MIMO utilization according to an embodiment of the present invention.
Figure 7:
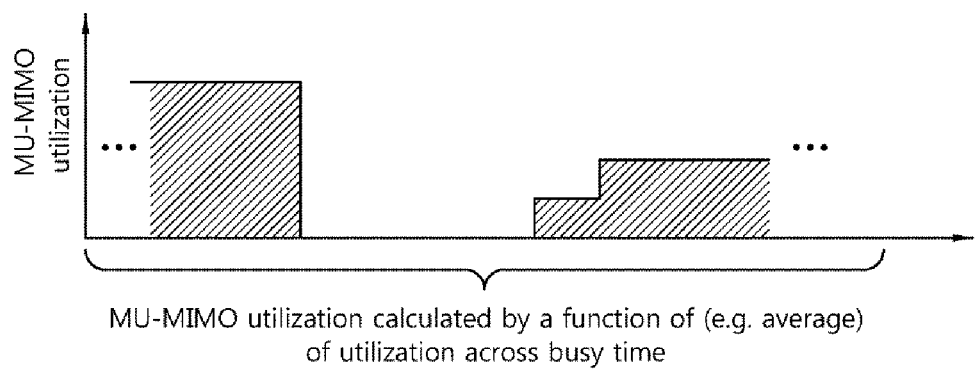
Figure 7:
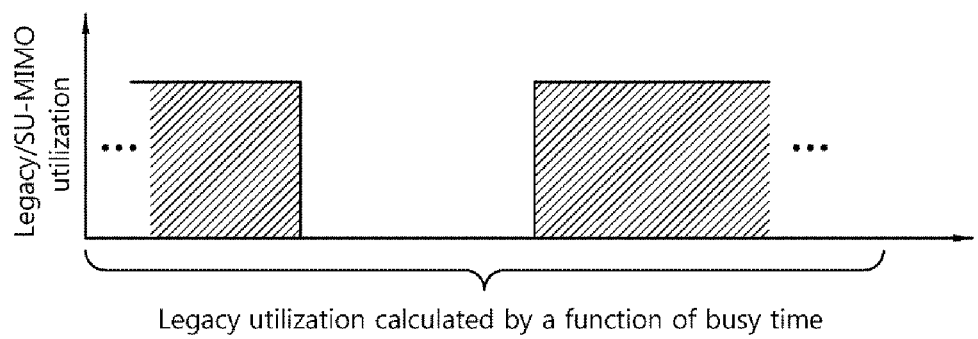

FIG. 7 shows a method of expressing a MU-MIMO utilization according to an embodiment of the present invention.

In the method of expressing the MU-MIMO utilization according to the embodiment of the present invention, instead of simply expressing whether a channel is busy or idle, a level of busyness is classified into several levels. For example, when there are remaining available spatial streams, it can be expressed by a low busy level, and when there is no available remaining spatial stream, it can be expressed by a maximum busy level. When a channel is idle, it can be expressed by a minimum busy level, a carrier sense (CS) busy time in which an AP does not perform MU-MIMO transmission can be expressed by a maximum busy level, and a utilization is expressed by an average busy level between the two levels. The busy level can be computed by the equation 2.

$$\text{MUMIMO\_Channel\_Utilization} = \text{Integer}((\text{channel\_busy\_level\_time}/(\text{maximum\_busy\_level} \times \text{dot11ChannelUtilizationBeaconIntervals} \times \text{dot11BeaconPeriod} \times 1024)) \times 255) \quad \text{[Equation 2]}$$

where channel_busy_level_time is defined to be the number of microseconds multiplied by channel_busy_level during which the CS mechanism, as defined in section 9.2.1 of IEEE 802.11-2007 specification, has indicated a channel busy indication.

channel_busy_level is defined to be 0 for idle CS times, maximum_busy_level for CS instances where the AP did not transmit in MU-MIMO data transmission, channel_busy_level is between 0 and maximum_busy_level and linearly scaled to number of utilized spatial streams for CS instances where AP has transmitted in MU-MIMO data transmission.

(e.g.1 channel_busy_level is equal to utilized spatial stream and maximum_busy_level is equal to maximum supportable spatial streams for STAs in MU-MIMO transmission mode)

Figure 8:
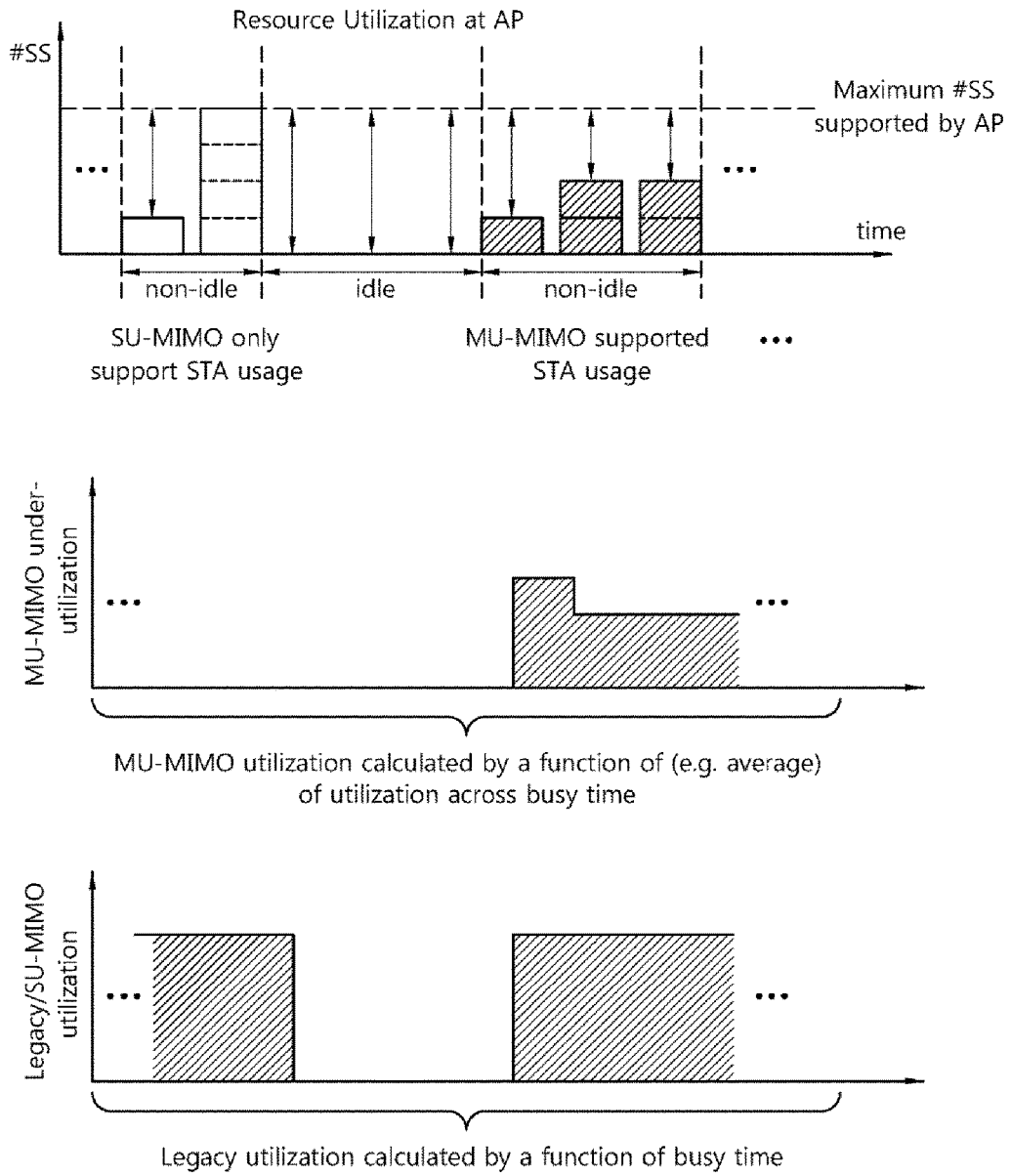
FIG. 8 shows another example of a method of expressing a MU-MIMO utilization according to an embodiment of the present invention.

FIG. 8 shows another example of a method of expressing a MU-MIMO utilization according to an embodiment of the present invention.

In another exemplary method of setting a MU-MIMO under utilization value, an under utilization is computed with several idle levels when an AP is busy due to MIMO data transmission, instead of expressing the under utilization with a simply idle level. In other words, MU-MIMO under utilization value may be defined as the percentage (or fraction) of time that AP has under utilized spatial domain resources (spatial stream) for busy time of the wireless medium. When more than one channel is in use for the BSS, the spatial stream under utilization value may be calculated only for the primary channel. For example, when there are remaining available spatial streams, it is expressed by a high idle level. When there is no available spatial stream, it is expressed by a minimum idle level or a busy level. An under utilization is expressed by an average idle level between the two levels. The idle level can be computed by the equation 3.

$$\text{MUMIMO\_Channel\_Under\_Utilization} = \text{Integer}((\text{channel\_idle\_level\_time}/\text{channel\_MUMIMO\_busy\_time}) \times 255) \quad \text{[Equation 3]}$$

where channel_MUMIMO_busy_time is defined to be the number of microseconds during the CS mechanism for MU-MIMO transmission at the AP.

channel_idle_level_time is defined to be the number of microseconds multiplied by channel_idle_level during which the CS mechanism, as defined in section 9.2.1 of IEEE 802.11-2007 specification, has indicated a channel busy indication.

(e.g.1 channel_idle_level is equal to maximum supported spatial stream-utilized spatial stream and maximum_idle_level is equal to maximum supportable spatial streams for a STA in MU-MIMO transmission mode)

(e.g.2 channel . . . idle . . . level is equal to min{maximum supported spatial stream for a single MU-MIMO STA, maximum supported spatial stream-utilized spatial stream} and maximum_idle_level is equal to maximum supportable spatial streams for a single STA in MU-MIMO transmission mode)

Figure 9:
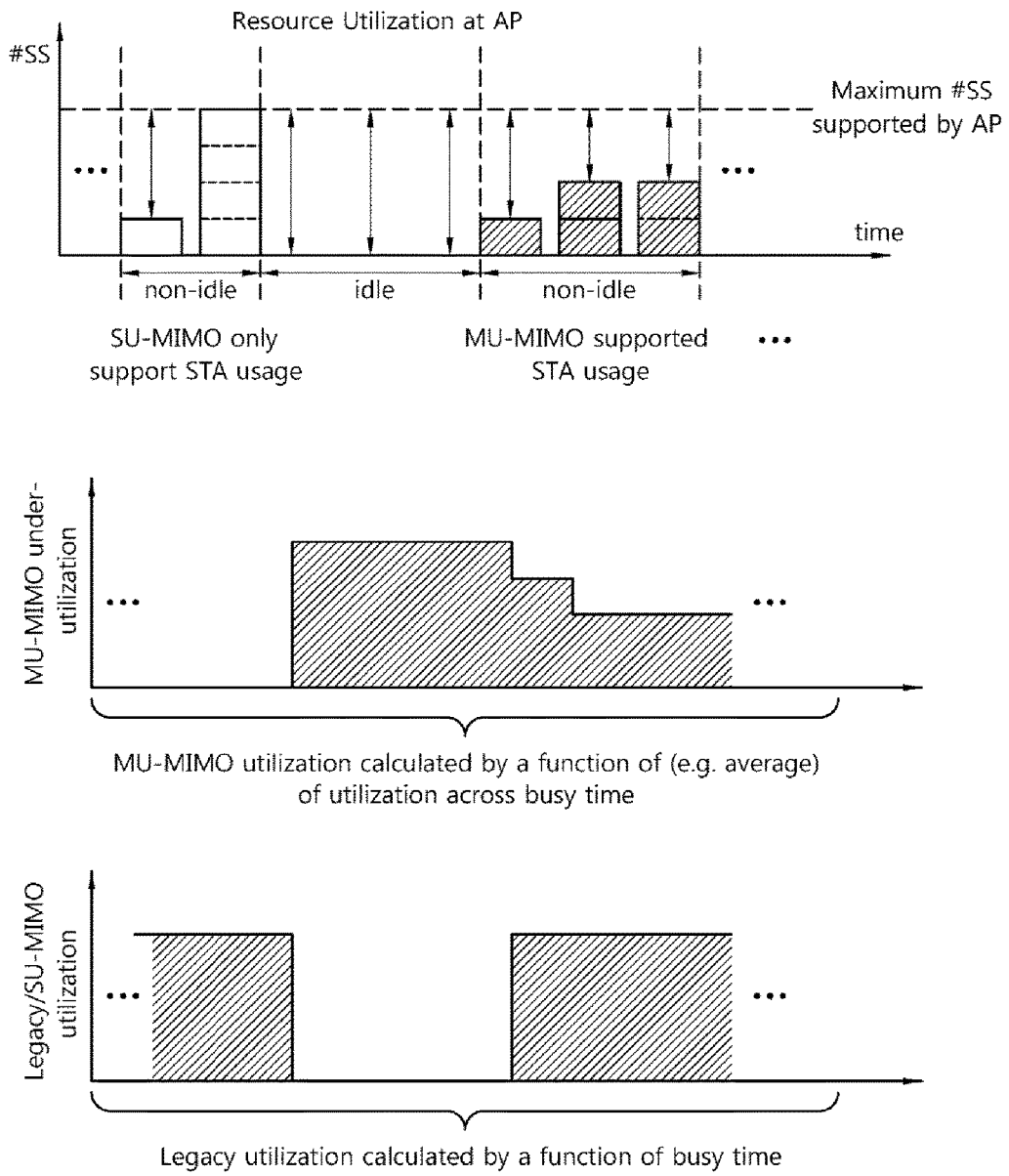
FIG. 9 shows another example of a method of expressing a MU-MIMO utilization according to an embodiment of the present invention.

FIG. 9 shows another example of a method of expressing a MU-MIMO utilization according to an embodiment of the present invention.

In another exemplary method of expressing a MU-MIMO under utilization, the MIMO under utilization computes an under utilization with several idle levels when a CS is idle and when an AP is busy due to MIMO data transmission, instead of expressing the under utilization with a simply idle level. For example, when there are remaining available spatial streams, it is expressed by a high idle level. When there is no available spatial stream, it is expressed by a minimum idle level or a busy level. An under utilization is expressed by an average idle level between the two levels. The idle level can be computed by the equation 4.

$$\text{MUMIMO\_Channel\_Under\_Utilization} = \text{Integer}((\text{channel\_idle\_level\_time}/(\text{channel\_idle\_time} + \text{channel\_MUMIMO\_busy\_time}) \times 255) \quad \text{[Equation 4]}$$

where channel_MUMIMO_busy_time is defined to be the number of microseconds during the CS mechanism for MU-MIMO transmission at the AP.

channel_idle_time is defined to be the number of microseconds during CS mechanism is not busy (i.e. idle).

channel_idle_level_time is defined to be the number of microseconds multiplied by channel_idle_level during which the CS mechanism, as defined in section 9.2.1 of IEEE 802.11-2007 specification, has indicated a channel busy indication.

(e.g.1 channel_idle_level is equal to maximum supported spatial stream-utilized spatial stream and maximum_idle_level is equal to maximum supportable spatial streams for a STA in MU-MIMO transmission mode, utilized spatial stream is zero for idle time instances)

(e.g.2 channel_idle_level is equal to min(maximum supported spatial stream for a single MU-MIMO STA, maximum supported spatial stream-utilized spatial stream) and maximum_idle_level is equal to maximum supportable spatial streams for a single STA in MU-MIMO transmission mode, utilized spatial stream is zero for idle time instances)

Hereinafter, a method of transmitting the aforementioned MU-MIMO utilization information to a non-AP STA will be described.

Figure 10:
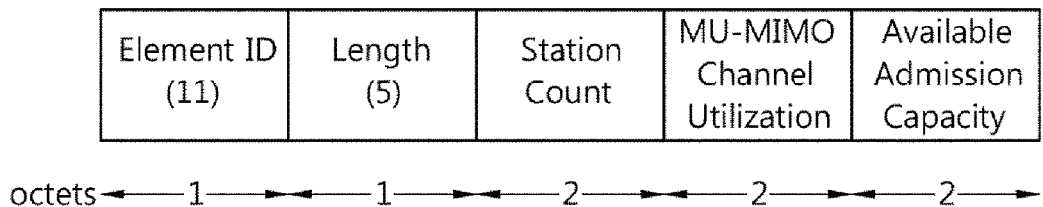
FIG. 10 shows an example of a BSS load IE format including MU-MIMO utilization according to an embodiment of the present invention.

FIG. 10 shows an example of a BSS load IF format including MU-MIMO utilization according to an embodiment of the present invention.

Non-AP STAs not supporting MU-MIMO transmission and non-AP STAs supporting MU-MEMO transmission can coexist within a BSS. In order for both the non-AP STAs not supporting MU-MIMO transmission and the non-AP STAs supporting MU-MIMO transmission to be able to obtain information on a load status of the BSS, an AP can transmit a BSS load element as shown in the example of FIG. 2, and can additionally transmit a supported BSS load element including the information on the load status of the BSS in a MU-MIMO transmission situation.

Figure 11:
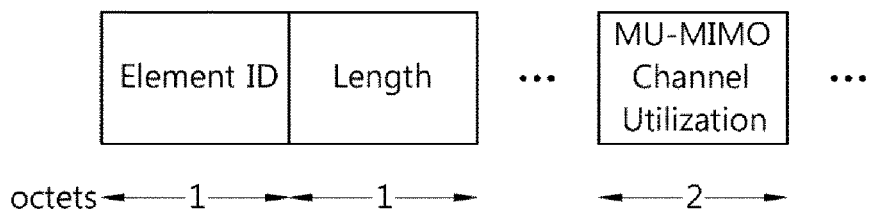
FIG. 11, 12 and FIG. 13 show an example of a BSS load IE format.
Figure 12:
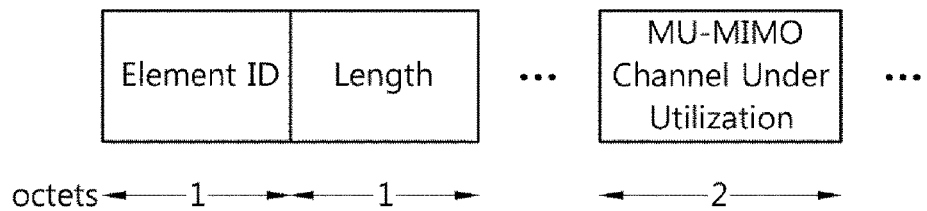

FIG. 11 and FIG. 12 show an example of a BSS load IE format.

Channel utilization information in MU-MIMO transmission is included in a MU-MIMO Channel Utilization field of FIG. 11 and a MU-MIMO Channel Under Utilization field of FIG. 12. The channel utilization information can be expressed by the number of spatial streams in use or the number of remaining available spatial steams. This will be described below in greater detail.

Figure 13:
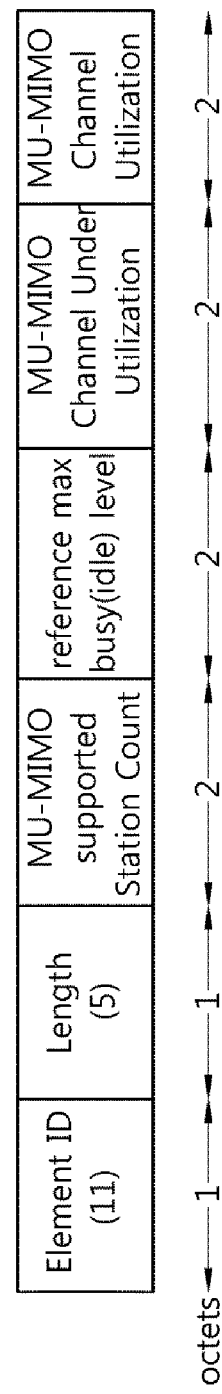

FIG. 13 shows another example of a BSS load IE format.

In addition, in a BSS load element according to an embodiment of the present invention, MU-MIMO channel under utilization information can be transmitted together along with MU-MIMO channel utilization information.

Meanwhile, any one channel can be used by a plurality of APs. For example, an overlapping BSS (OBSS) environment in which a BSA of different BSSs using the same channel overlaps partly or wholly can be assumed. In this environment, when any AP computes a load of a channel, it may be computed such that the channel is busy in a period in which another AP uses the channel. The AP can report information on a MU-MIMO load status (i.e., an un-used spatial stream count or a used spatial stream count) to non-AP STAs within a BSA of the AP only in a busy-time duration in which the AP performs MU-MIMO transmission.

Even if the AP performs SU-MIMO transmission, information on the un-used spatial stream count or the used spatial stream count can be reported to the non-AP STAs within the BSA of the AP in a time duration in which SU-MIMO transmission is achieved. When the AP transmits data to an STA not supporting MU-MIMO, the time duration can be determined to a busy-time.

A BSS load IE to be transmitted by the AP in the BSS supporting MU-MIMO may further include Current Throughput, Utilized Spatial Streams, Average Transmit bandwidth (BW), and Number of MU-MIMO capable STAs.

Current Throughput is a type of load status information, and can be defined as follows.

"Load=num_transmit_bytes/max_num_transmit_bytes"

Both num_transmit_bytes, and max_num_transmit_bytes are number of bytes in a observed time window similar to what is defined in the BSS load element channel utility definition 'transmit_bytes' may count bytes regardless of whether or not particular packet has not been ACKed The load is an indicator of how the medium is busy, so even if the transmitted packet has not succeeded it still took a chunk of the medium access time In the definition of Current Throughout, packets are still counted even if ACK is not received. This is to indicate a throughput used when a channel medium is consumed. However, since accurate AP's throughput information can be requested in some cases, the throughput can be expressed in practice in throughput computation by counting only packets for which ACK is received and which are successfully received upon receiving ACK.

Figure 14:
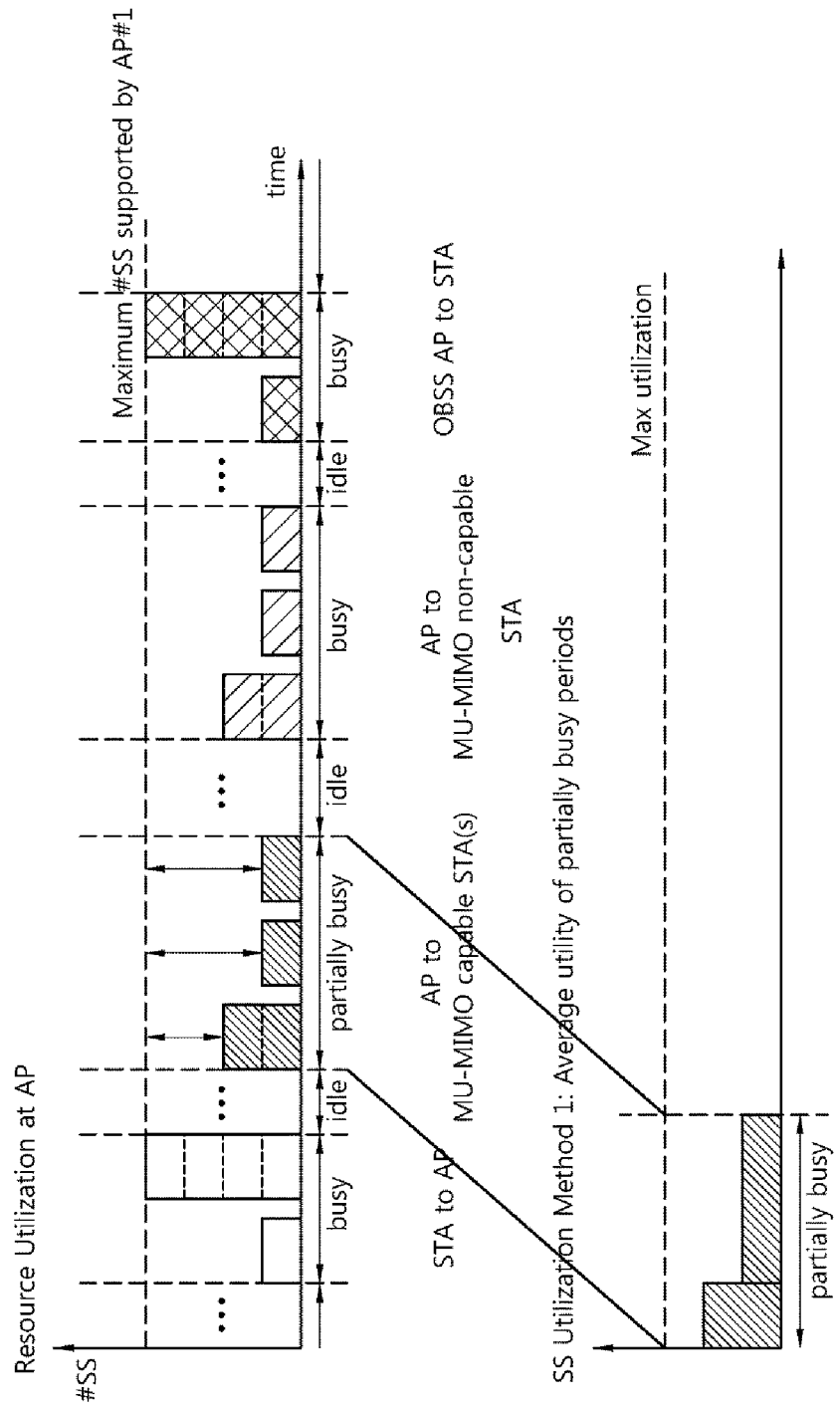
FIGS. 14 and 15 show an example of computing an average spatial stream count in a metric manner.

In Utilized Spatial Streams, average transmission spatial stream information can be expressed by computing an average spatial stream count in a metric manner within a time in which an AP sends a data PPDU to a MU-MIMO capable STA. FIG. 14 shows an example thereof.

"Load=average_num_transmit_$ss1$/max_num_transmit_$ss$"

Figure 15:
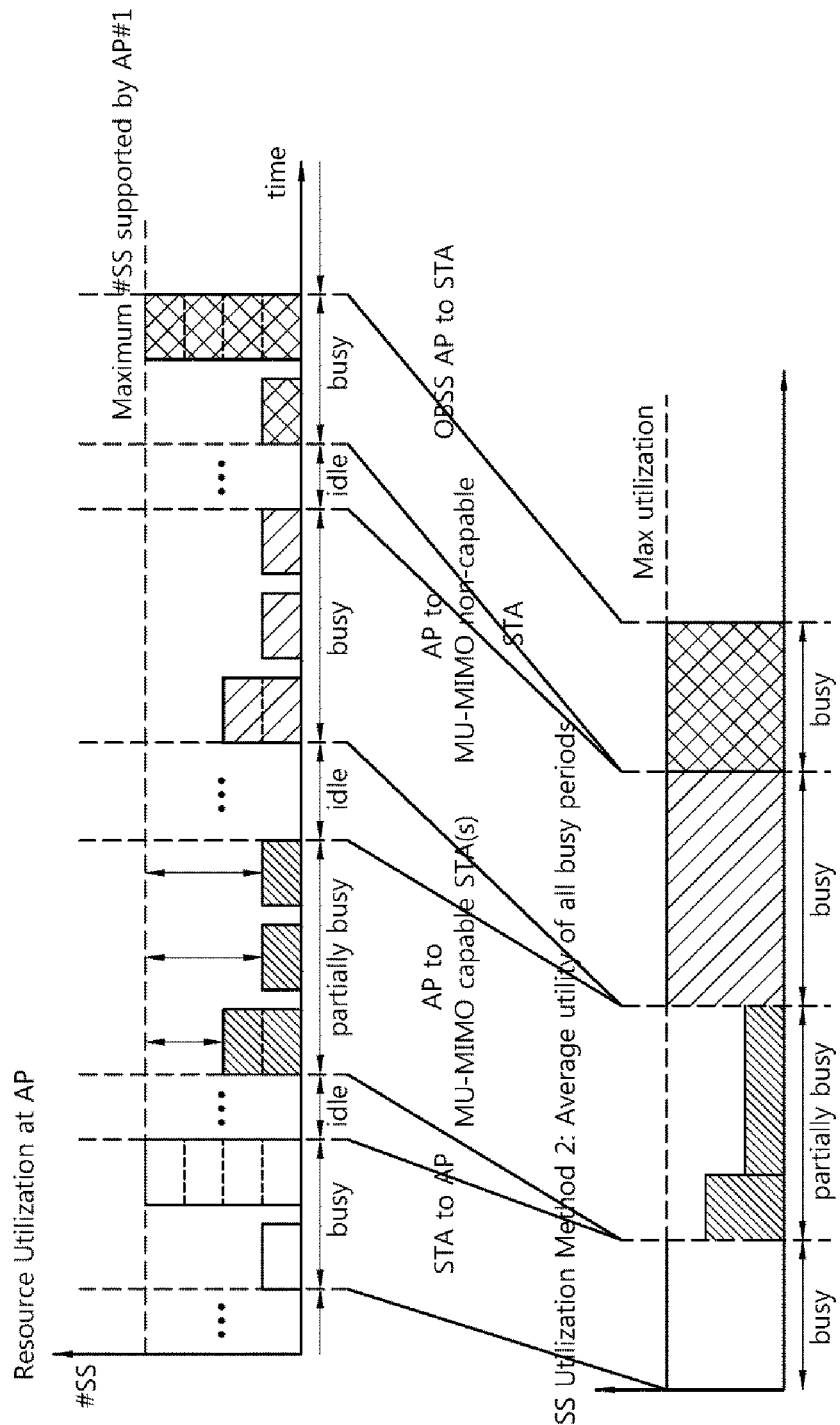

In order to give insight on MU-MIMO capability, the 'average_num_transmit_ss1' may be only computed using channel medium busy time in which the AP was serving data to MU-MIMO capable STAs In another example of Utilized Spatial Streams, average transmission spatial stream information can be expressed by computing an average spatial stream count in a metric manner within a time in which an AP sends a data PPD to a MU-MIMO capable STA, and can be expressed by averaging a maximum spatial stream count defined in a medium busy period in which the AP does not send the data PPDU to the MU-MIMO capable STA. FIG. 15 shows an example thereof "Load=average_num_transmit_$ss2$/max_num_transmit_$ss$"

In order to give insight on MU-MIMO capability, the 'average_num_transmit_ss2' is computed across all channel medium busy time and may is equal to 'max_num_transmit_ss' when the channel medium is busy because of other STA using the medium or AP serving data to non-MU-MIMO capable STAs For STAs, it will be beneficial to get ratio in which STA could have been in SU or MU-MIMO transmission mode and information on expected under-utilized spatial dimension at AP side Utility measurement method in FIG. 14 lacks information on what would have been the ratio between under-utilized busy medium status and fully utilized busy medium status. SS utility measurement in FIG. 14 close to 0 does not necessary mean MU-MIMO capable STAs were serviced frequently nor does it mean any future STAs will be serviced frequently in MU-MIMO Current Throughput may not give spatial domain utilization information and may depict the wrong picture. Throughput loss can occur due to particular STAs channel conditions (link adaptation issues). Low throughput has not relationship between MU-MIMO capable STAs and channel utility.

Figure 16:
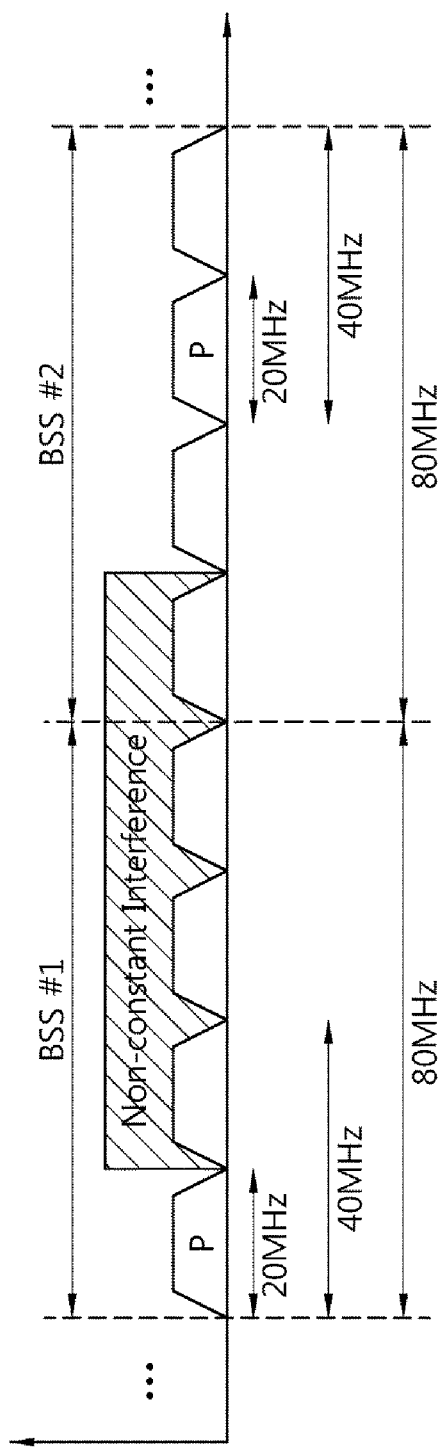
FIG. 16 shows an example of transmission when interference occurs in a specific band.

The average transmit bandwidth (BW) is information regarding a bandwidth of a channel used by the AP. Average information of a transmission bandwidth utilized in the BSS may be delivered to the STA, which facilitates a process of selecting a BSS by the STA. This is because, even if channel utilization information of the same BSS load element is present, a transmission bandwidth in which a channel utility is used may differ on average in each BSS. In particular, when interference occurs in a specific band, a full bandwidth cannot always be used, and transmission and reception will be performed by partly adapting the bandwidth. Each BSS may have a different available bandwidth. FIG. 16 shows an example thereof. If the primary subchannel is not affected by the interference, medium access and load of the primary subchannel is unaffected. Average BW utilization may not be the same even with same legacy BSS load utility Transmission BW of an AP can be restricted by not only other BSS in different sub-channels but also 3rd party wireless signals in 5 GHz band. STAs wanting more throughput may want information an typical BW usage for a given BSS.

Number of MU-MIMO capable STAs denotes the number of non-AP STAs supporting MU-MIMO. MU-MIMO capable STAs might want to associate itself with BSS with more MU-MIMO capable advanced STAs in order to fully exploit potential MU-MIMO benefits.

Figure 17:
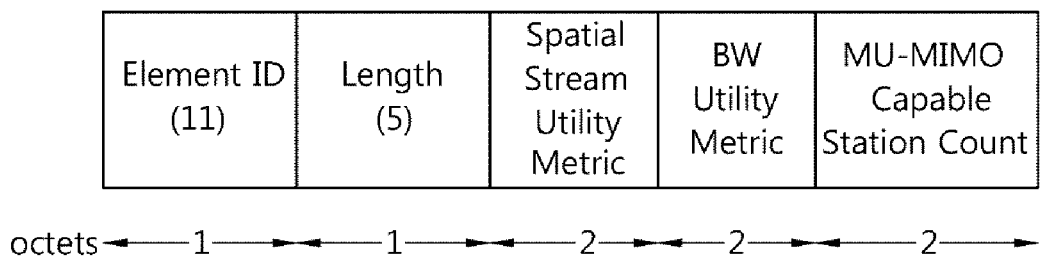
FIG. 17 shows a BS load IE format according to an embodiment of the present invention.

FIG. 17 shows a BS load IE format according to an embodiment of the present invention. Herein, a spatial stream utility metric is a MU-MIMO channel utility metric. In this case, a medium busy time utilized for a MU-MIMO capable STA by an AP can be computed as spatial stream information actually used. Further, the remaining busy time can be assumed as maximum spatial stream information in computation.

The BSS load IE format may include a Spatial Stream Utility Metric field, a Bandwidth Utility Metric field, and a MU-MIMO Capable STA Count field. A length of each field of FIG. 17 is for exemplary purposes only, and thus can be increased or decreased if necessary when implemented. A field transmission order and information included in the BSS load IE format of FIG. 17 is information that can be included in the BSS load IE in the present invention, and can include the exemplified information wholly or partly.

Hereinafter, each field will be described in greater detail.

Spatial Stream Utility Metric may be represented as below.

Spatial Stream Utility Metric=((spatial stream busy level time/(max-spatial-stream-busy-level*channel busy time))*255)

'spatial stream busy level time' is defined to be total sum of 'number-of spatial-streams' multiplied by number of microseconds during which CS mechanism has indicated channel busy indication 'number-of-spatial-streams' may be equal to transmitted number of spatial streams during which the AP has occupied the medium to transmit PPDU to MU-MIMO capable STA(s), otherwise (i.e. other channel busy instances) may be equal to 'max-spatial-stream-busy-level'

Bandwidth Utility Metric may be represented as below.

Bandwidth Utility Metric=((transmit bandwidth busy time/(max-transmit-bandwidth*BSS medium busy time))*255)

'transmit bandwidth busy time' is defined to be total sum of 'transmit-bandwidth' multiplied by number of microseconds during which device in the BSS (i.e. AP or non-AP STA which is associated with the AP) has been detected to occupy the medium 'transmit-bandwidth' may be equal to transmitted PPDU bandwidth, Where 'BSS medium busy time' is defined as number of microseconds during which device in the BSS (i.e. AP or non-AP STA which is associated with the AP) has been detected to occupy the medium Number of MU-MIMO capable STAs may be interpreted as an unsigned integer that indicates the total number of STAs with MU-MIMO transmission reception capability currently associated with this BSS.

Several measurement problems may arise in a process of reporting information on a bandwidth usable or available in any BSS. For example, measurement is impossible while an AP transmits a specific signal. In addition, according to implementation, there is a case where measurement cannot be performed simultaneously while decoding a PPDU which is being received. In order to solve the several problems, a bandwidth-related metric will be defined and a method of utilizing the metric will be described hereinafter according to an embodiment of the present invention.

Bandwidth Utility Metric according to the embodiment of the present invention can be reported in a state where a channel medium is idle (herein, idle means that a primary channel is idle in the specific BSS) by measuring whether a channel is idle for each available bandwidth, which can be used by a specific BSS in an idle state. In this case, the available bandwidth that can be used by the BSS may be 20 MHz, 40 MHz, 80 MHz, 160 MHz, or 80+80 MHz. For example, through channel carrier sensing, each idle time is computed for various bandwidth such as 20/40/80/160 by including a primary subchannel, and a computation result is reported for each bandwidth. Reporting for each bandwidth may be a way of indicating a maximum bandwidth in an idle state.

In computation, a bandwidth utility value for a wider bandwidth may fully include an idle time computed in a smaller bandwidth utility. For example, if it is determined that a bandwidth of 40 MHz is idle, it is natural that a bandwidth of 20 MHz is idle. Thus, a 40 MHz idle time can be included when computing a 20 MHz idle time. Alternatively, the 20 MHz idle time may not include the 40 MHz idle time in order to deliver a metric indicating that a channel medium other than 20 MHz was busy for other available bandwidths. Bandwidth Utility Metric can be reported by computing an average value of a metric which is idle for each bandwidth.

According to another embodiment, Bandwidth Utility Metric can be computed by using a bandwidth of a PLCP protocol data unit (PPDU) to be transmitted immediately before transmission of a specific PPDU by an AP in a BSS.

In a specific band other than a band in which transmission is performed, the AP cannot know whether another BSS uses the specific band while a PPDU is being transmitted. Therefore, it is difficult to compute an accurate bandwidth utility while the PPDU is transmitted.

Under the assumption that a status (i.e., whether it is an idle or not) for each bandwidth of a channel medium is maintained while the PPDU is transmitted, Bandwidth Utility Metric can be computed by using a bandwidth used in transmission of the PPDU.

When a specific PPDU is received by an AP in a BSS, a method of measuring a bandwidth spanned by the received PPDU and for computing whether a medium is busy for each bandwidth can be used. An average value of a metric which is busy for each bandwidth can be reported.

According to an embodiment, Bandwidth Utility Metrics obtained by the aforementioned two methods can be both reported or a sum of Bandwidth Utility Metrics can be reported. By transmitting both Bandwidth Utility Metrics or by reporting the sum of Bandwidth Utility Metrics, STAs to be associated can fully recognize whole information regarding an idle and busy time according to corresponding information, thereby being able to select a suitable AP.

FIG. 18 shows an example of a BSS load IE according to an embodiment of the present invention when channel utility information is reported for each bandwidth.

The BSS load IE may include a MU-MIMO capable STA Count field, a Spatial Stream Utility field and a plurality of BW utility fields. The MU-MIMO capable STA Count field indicates the total number of STAs with MU reception capability currently associated with the BSS. The STAs with MU reception capability support MU-MIMO transmission and/or reception. The Spatial Stream Utility field indicates the state of resource utilization. The state of resource utilization may be computed by the each method described with FIG. 6~17.

BW utility is reported for each bandwidth. Time information in a state where corresponding information is idle is reported for each bandwidth. A field containing information on a bandwidth not supported in a corresponding BSS can be omitted in a generation procedure or a transmission procedure of the BSS load IE.

Bandwidth Idle Utility Metric may be represented as below.

$$\text{Bandwidth Idle Utility Metric} = ((\text{idle\_time\_per\_bandwidth}/(\text{BSS medium idle time}))*255)$$

'idle_time_per_bandwidth' is defined to be number of microseconds during which either 20/40/80/160 MHz bandwidth has been detected to be idle, Where 'BSS medium idle time' is defined as number of microseconds during which AP detected the medium of the primary channel to be idle.

When BW utility is information about busy time of each of the channel bandwidth, Bandwidth Busy Utility Metric may be represented as below.

$$\text{Bandwidth Busy Utility Metric} = ((\text{busy\_time\_per\_bandwidth}/(\text{BSS medium busy time}))*255)$$

'busy_time_per_bandwidth' is defined to be number of microseconds during which device in the BSS (i.e. AP or non-AP STA which is associated with the AP) has been detected to occupy the medium for either 20/40/80/160 MHz bandwidth Where 'BSS medium busy time' is defined as number of microseconds during which device in the BSS (i.e. AP or non-AP STA which is associated with the AP) has been detected to occupy the medium FIG. 19 shows an example of a BSS load IE format when reporting both a BW idle metric and a BW busy metric.

Figure 20:
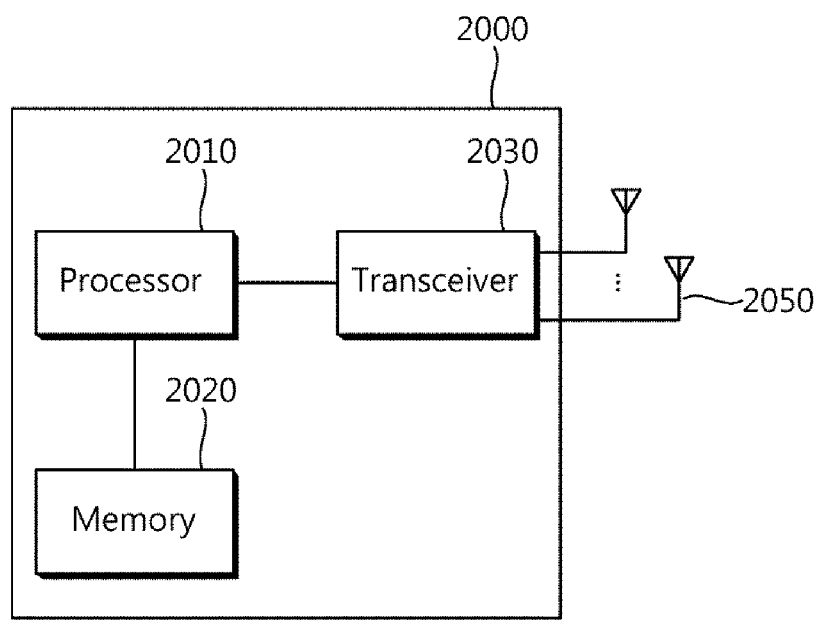
FIG. 20 is a block diagram showing a radio apparatus for implementing an embodiment of the present invention.

FIG. 20 is a block diagram showing a radio apparatus for implementing an embodiment of the present invention. A radio apparatus 2000 may be an AP or a non-AP STA.

The radio apparatus 2000 includes a processor 2010, a memory 2020, a transceiver 2030, and multiple antennas 2050. The transceiver 2030 is configured to transmit and/or receive a management frame of the present invention. The processor 2010 is functionally coupled to the transceiver 2030 and is configured to generate and process the management frame. The processor 2010 and the transceiver 2030 implement a PHY layer and a MAC layer of IEEE 802.11. The processor 2010 and/or the transceiver 2030 may include an application-specific integrated circuit (ASIC), a separate chipset, a logic circuit, and/or a data processing unit. The memory 2020 may include a read-only memory (ROM), a random access memory (RAM), a flash memory, a memory card, a storage medium, and/or other equivalent storage devices. When the embodiment of the present invention is implemented in software, the aforementioned methods can be implemented with a module (i.e., process, function, etc.) for performing the aforementioned functions. The module may be stored in the memory 2020 and may be performed by the processor 2010. The memory 2020 may be located inside or outside the processor 2010, and may be coupled to the processor 2010 by using various well-known means.

The aforementioned embodiments include various exemplary aspects. Although all possible combinations for representing the various aspects cannot be described, it will be understood by those skilled in the art that other combinations are also possible. Therefore, all replacements, modifications and changes should fall within the spirit and scope of the claims of the present invention.

What is claimed is:

1. A method for reporting load information, performed by access point (AP), in a wireless local area network system, the method comprising:

calculating, by a processor in the AP, intervals during which a 40 MHz channel width or an 80 MHz channel width is busy; and transmitting, by a transceiver in the AP, basic service set (BSS) load information to a station, the BSS load information including a multi user (MU) multiple input multiple output (MIMO) capable station count field, a first utilization field and a second utilization field, wherein the MU-MIMO capable station count field indicates a total number of stations with MU reception capability currently associated with a BSS managed by the AP, wherein the first utilization field includes information about an interval during which the 40 MHz channel width is busy, and wherein the second utilization field includes information about an interval during which the 80 MHz channel width is busy.

2. The method of claim 1, wherein the BSS load information further includes a spatial stream utilization field indicating an interval during Which the AP utilizes at least one spatial streams.

3. The method of claim 1, wherein the BSS load information is transmitted in a beacon frame or a probe response frame.

4. A device for a wireless local area network, the device comprising:

a transceiver configured to transmit radio signals; and a processor operatively coupled with the transceiver and configured to;

calculate intervals during which a 40 MHz channel width or an 80 MHz channel width is busy; and instruct the transceiver to transmit basic service set (BSS) load information to a station, the BSS load information including a multi user (MU) multiple input multiple output (MIMO) capable station count field, a first utilization field and a second utilization field, wherein the MU-MIMO capable station count field indicates a total number of stations with MU reception capability currently associated with a BSS managed by the device, wherein the first utilization field includes information about an interval during which the 40 MHz channel width is busy, and wherein the second utilization field includes information about an interval during which the 80 MHz channel width is busy.

5. The device of claim 4, wherein the BSS load information further includes a spatial stream utilization field indicating an interval during which the AP utilizes at least one spatial streams.

6. The device of claim 4, wherein the BSS load information is transmitted in a beacon frame or a probe response frame.

* * * * *